J. HARRIS.
Car Brake.
No. 20,396. Patented May 25, 1858.
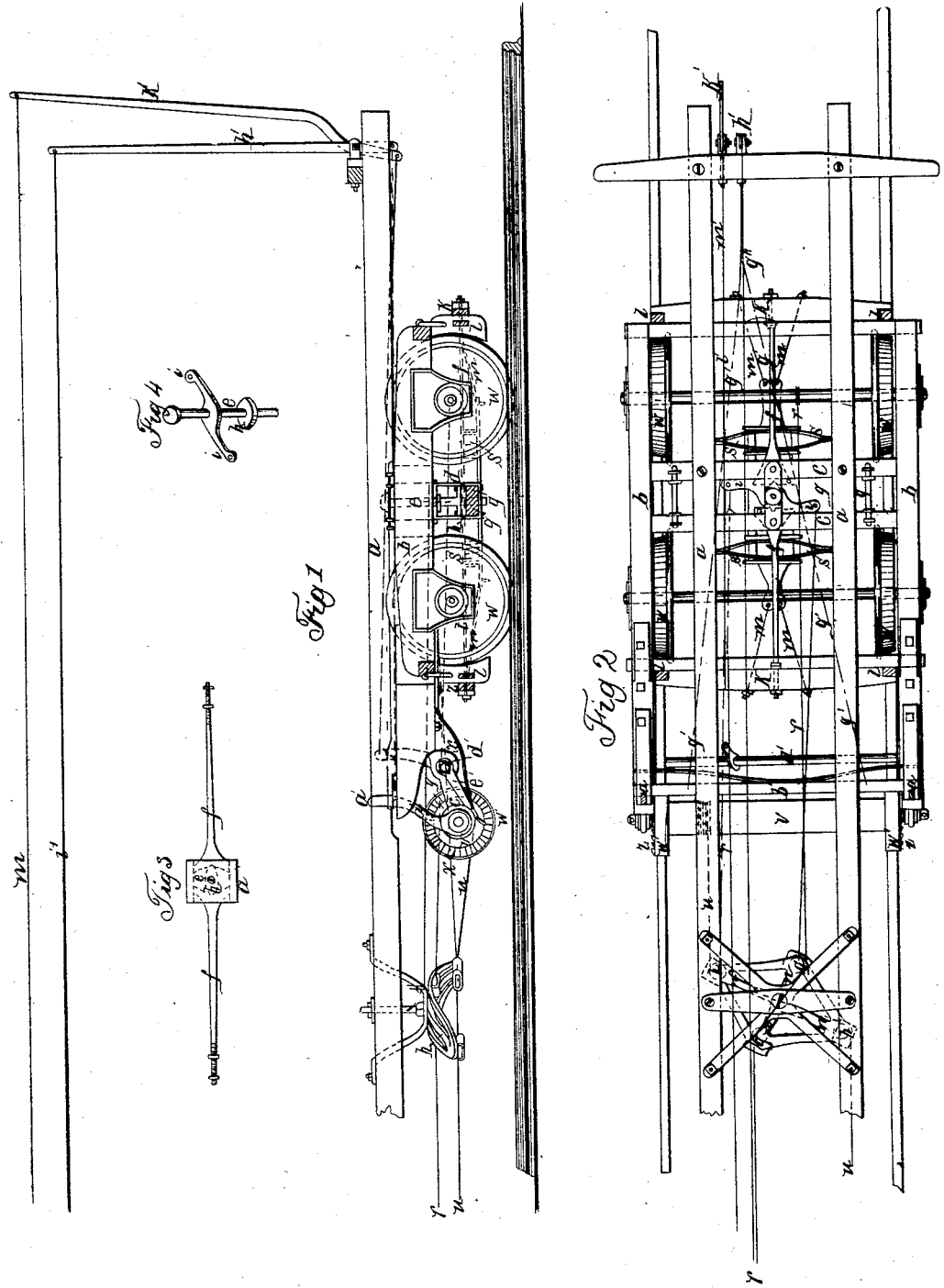

UNITED STATES PATENT OFFICE.

JOS. HARRIS, OF ALLEGHENY CITY, PENNSYLVANIA.

RAILROAD-BRAKE.

Specification of Letters Patent No. 20,396, dated May 25, 1858.

*To all whom it may concern:*

Be it known that I, JOSEPH HARRIS, of the city of Allegheny, in the county of Allegheny and State of Pennsylvania, have invented a new and useful Improvement in Railroad-Brakes; and I do hereby declare the following to be a full, clear, and exact description thereof, reference being had to the annexed drawing, forming part of this specification, in which—

Figure 1 is a side elevation of the rear end of the last car of a train of cars, showing attached thereto my automatic brake. Fig. 2 is a vertical plan of the truck and apparatus shown in Fig. 1. Fig. 3 is a representation of the extension shaft which relieves the brakes from the wheels of the trucks, showing the operation of the tumbler. Fig. 4 is a representation of the tumbler for liberating the springs.

In the several drawings like letters of reference denote similar parts of my apparatus.

In my improved brake, the power is applied to the brakes by powerful elliptical springs operating automatically, when set free, to press the rubbers of the brakes against the tires of the wheels, and thus produce an instantaneous retardation of the motion of the cars without the application of any power outside of the inherent force of the springs other than that necessary to set them free, which is very trifling. The entire control of the brakes, both in braking up a train and in releasing the brakes and resetting them for repeated use, is given to the engineer, so that the use of brakemen on any of the cars is entirely dispensed with. The power of instantaneously applying the brakes is also entirely at the command of the conductor of the train. The brakes are applied first to the hindmost car, and then to the other cars in succession, so that the retarding motion of the train will not cause them to bump up against each other; and yet the application of the brakes in the several cars, is accomplished in such rapid succession, that there is no danger whatever of the cars being pulled apart by the dragging of the hinder cars of the train: the whole being done almost instantaneously.

My invention consists then, in the use of a cross arm on each car in the train, in combination with a chain shaft on one car, connected by chains, ropes, or rods, for the purpose of adjusting the brakes, and setting them in operation. Also in the use and combination of a tumbler, with the extension shafts and purchase rods of the brake, and springs as a railroad brake operating automatically.

To enable others skilled in the art, to make and use my improved brake, I will proceed to describe its construction and operation.

In the drawings (Figs. 1 and 2) *a, a,* are the bottom sills of the car body. *b, b,* are the frame work of the hinder truck. Between the cross bars *c, c,* is placed the slide box *d* (Fig. 3) in which work the heads of the two extension rods *f, f.* Through the center of the slide box *d* the king bolt *e* (Fig. 4) passes vertically down, the lower end passing through and turning on its axis in the sand board *g.* This king bolt *e* has on it a tumbler *h*, which works in the slide box *d*, the points of the tumbler *h* (when the brakes are not in operation,) resting in notches in the heads of the extension shafts *f, f,* as shown in Figs. 2 and 3, thus forcing the extension shafts apart. Above the tumbler *h*, on the king-bolt, *e*, is a cross arm *i*, by which the tumbler is worked. The end of each of the extension shafts *f, f,* is firmly attached to one of the brake beams *k k* which extend across the truck outside of the wheels *w, w,* and to the extremities of which brake beams *k k* are attached the rubbers *l, l,* in the usual manner. *s, s,* are two powerful leaf springs, one placed before and the other behind the king bolt *e* and sliding box *d*, outside of the cross bars *c c.* These springs open inward toward the king bolt *e* and are attached to the purchase rods *m, m,* which are also firmly attached to the brake beams *k k,* so that when the springs are set free, they open and draw the purchase rods inward and with them the brake beams *k k*, thus pressing the rubbers with all the force of the springs against the tires of the wheels of the truck. This is all the machinery of the brake proper, and is very simple in construction and operation: the other parts of my apparatus being designed merely to set these brakes or apply them, as occasion requires. They operate thus: When the arm *i* of the king bolt *e*, is set, so that the points of the tumbler *h*, are in the notches in the elliptical heads of the extension shafts *f, f,* in the slide box, the springs *s, s,* are held back by the extension shafts *f, f,* forcing the brake beams *k k* away from the center of the truck, and keeping the rubbers from the wheels: but a slight pull of one end of the arm *i* causes the points of the tumbler $h$ to escape from the notches in the heads of the extension shafts $f$, $f$, and sets free the springs which immediately operating on the purchase rods $m$ $m$ apply the brake as before described to the tires of the wheels $w$, $w$. A brake similarly constructed is applied to each truck on every car.

I will now proceed to describe how the brakes are set, by which I mean, the arms $i$ of the king bolt so adjusted that the tumbler $h$, shall relieve the brakes and set them ready for use. In the middle of each car and equidistant from both trucks, is placed a turning cross arm $n$ composed of a long and a short arm, crossed at right angles and turning on a bolt $o$, at the intersection of the arms. At each extremity of the long arm is a pulley $p$, $p'$, and at each extremity of the short arm is a pulley $q$, $q'$. A rod or chain $r$ connects the point $p$ of the long arm with one end of the arm $i$ of the king bolt $e$, and another rod or chain $r'$ connects the point $q$ of the short arm with the other end of the arm $i$ of the king bolt $e$. Thus when the cross arm $n$, is in the position shown in Fig. 2 (which I shall call an inverted position) the brake is set, but if the cross arm be turned so that the points $p$ $p'$ will be parallel with the sides of the car, the points of the tumbler $h$ will slip from the heads of the extension shafts, and the brake is at once applied. To turn the cross arm $n$ from a parallel to an inverted position, and thus set the brakes I have the following contrivance. A cord or chain $t$ fastened (see blue line Figs. 1 and 2) at one end to the hindmost truck is passed through the pulley $q$, on the short arm of the cross arm $n$ to the pulley $q'$ on the other end of the short arm, and thence under all the cars, through corresponding pulleys in the cross arms $n$ on each several car, and thence to the locomotive, where it is fastened, and may be drawn tight either by passing around a shaft operated with a wheel, or by uncoupling the locomotive from the train, and running on a few yards until the rope is tight, and then backing and connecting with the train. The pulling of the cord $t$ tight, will given an inverted position to the cross arm on every car, and thus set the brakes, ready for use on each separate truck: each cross arm being connected with the arm of the king bolt on both the trucks between which it is placed.

It now remains to be shown how the brakes may be applied by the engineer or conductor. This of course is done as before shown, by turning the cross arm on each car from an inverted to a parallel position, which is effected as follows: A chain $u$ is extended under all the cars in the train, fastened securely at one end to the front part of the first car, and through the cross arm in each car, passing through the pulley $p'$, thence through the pulley $p$, until it reaches the chain shaft $v$, around which it is wound, passing first under the shaft, so that the forward motion of the cars will wind up the chain around the chain shaft, drawing it tight, first in the hindmost car, but almost instantaneously in all the cars, bringing the points $p$, $p'$, in each and every cross arm $n$, parallel with the sides of the cars, and at once freeing every brake, and bringing the springs into full and immediate action. The winding of the chain $u$, around the chain shaft $v$ is effected by the forward motion of the cars. The chain shaft, (one only being used on each train, and that one attached to the hindmost car,) is a wrought iron axle, weighing about two hundred pounds, with a wheel $w'$ at each end firmly pressed on and secured to the chain shaft: these wheels $w'$ rest on the rail road track, when the chain shaft is lowered, and in addition to their own weight are pressed down by curved springs $x$ (see Fig. 1.) (one to each wheel). A pawl $y$, works in ratchet teeth $z$ on the side of the wheel $w'$ and keeps the chain tight as it is wound by the revolution of the chain shaft $v$, on the track: and so soon as the chain is fully strained, and before it is in danger of breaking the tension of the chain $u$, will overcome the weight of the shaft $v$, and the force of the springs $x$, $x$, and raise the chain shaft $v$ off the track sufficiently to stop its rotation, and consequently the further winding of the chain. It is obvious that if by any accident one or more cars should become detached from the rest of the train, the tension of the chain $u$, whether it break or not, will operate all the brakes, before any one on the train should become aware of the trouble: and as the operation of the brakes when the chain is drawn tight, is dependent for its force on the springs to each brake and not on the degree of power applied to the chain, the separation of the cars would not interfere with its action on all the cars.

When the brakes are set it is desirable that the chain $u$, should be loose, and it is necessary also that the wheels $w'$ of the chain shaft $u$ should not touch the track. The chain shaft is fastened to the truck by a link $c'$ one at each end, which links pass over the end of the axle of the chain shaft $v$ and also over the axle $d'$, working loosely on both; the lever arms $e'$ projecting from the axle $d'$, raising the chain shaft $v$, when the axle $d'$ is turned by the lever $f'$. Whenever the chain shaft $v$ is raised by the lever $f'$, it is held up off the track by two hangers $a'$ $a'$, one fastened to each end of the axle of the chain shaft, which hangers pass up to a spring bar $b'$, which is pressed by its springs $x$ into notches in the top of the hangers $a'$ $a'$, and thus sustains the weight of the chain shaft $v$, and pressure of the springs $x$ $x$. When the chain shaft is thus raised, the pawls $y$, pass below the ratchets $z$ on the side of the wheels $w'$ of the chain shaft, and resting on a smooth part of the wheel, leave the chain shaft free to rotate and relieving the tension of the chain. It is manifest therefore, that the brakes are to be set in operation by dropping the chain shaft $v$, down so that its wheels $w'$ may press on the tracks; this must be done by withdrawing the spring bar $b'$, which sustains the chain shaft, when raised as before stated. To effect this, the rods or chains $g'$ $g'$ uniting at $g''$ are connected with the short arm of the lever $h'$ from the upper end or long arm of which a bell cord $i$ passes through the cars, close to the roof, so as to be accessible to the conductor in any car, and thence to the locomotive, and a slight touch of that cord by either engineer or conductor, will lower the chain shaft and put on every brake on the train, instantaneously. The lever $f'$ can be drawn back to raise the chain shaft from the truck, so soon as the brakes are set free to operate by another lever $k'$, the short arm of which is connected by a chain or rod $l'$ with the lever $f'$, and to the long arm of which another cord $m'$ passes over the roof outside of the cars to the locomotive. So soon as the cars are fully stopped, the brakes may be again set for repeated use by the engineer straining the cord $t$, as before described, which will set every brake on the whole train, by putting the cross arm $n$ on each car again in an inverted position.

To recapitulate briefly the operation of my apparatus: Pulling the bell cord $i'$, withdraws the spring bar $b'$, lowers the chain shaft $v$ on the track, which winds the chain $u$ until all the cross arms $n$ assume a parallel position, this frees the tumbler $h$, from the heads of the extension shafts $f$ on each truck, and sets the springs $s$, $s$, free to operate, and brakes down the train instantaneously. The cord $m'$ is then pulled by the engineer, to raise the chain shaft $v$, and when the cars are sufficiently retarded, the tension of the chain $t$, by the engineer in either of the methods specified, resets all the brakes.

Having thus described my improved brake, what I claim as my invention and desire to secure by Letters Patent is—

1. The combination of the cross arms on each of several cars, with a chain shaft on one car, connected as described by chains, rods or ropes, for the purpose of adjusting and operating the brakes in the manner substantially as hereinbefore set forth.

2. The combination of the tumbler $h$, with the extension shafts $f$, $f$, the purchase rods $m$, $m$, and springs $s$, $s$, to act automatically as a rail road brake, substantially in the manner hereinbefore described.

In testimony whereof I have hereunto set my hand this sixteenth day of April A. D. 1858.

JOSEPH HARRIS.

Witnesses:
MARTIN G. CARLING,
W. DUDLEY KING.